(12) United States Patent
Vion-Dury

(10) Patent No.: US 8,171,296 B2
(45) Date of Patent: May 1, 2012

(54) SYSTEM AND METHOD FOR PRODUCING AND CHECKING VALIDATION CERTIFICATES

(75) Inventor: Jean-Yves Vion-Dury, Biviers (FR)

(73) Assignee: Xerox Corporation, Norwalk, CT (US)

( * ) Notice: Subject to any disclaimer, the term of this patent is extended or adjusted under 35 U.S.C. 154(b) by 932 days.

(21) Appl. No.: 12/169,131

(22) Filed: Jul. 8, 2008

(65) Prior Publication Data

US 2010/0011224 A1   Jan. 14, 2010

(51) Int. Cl.
*G06F 21/00* (2006.01)
(52) U.S. Cl. .......................... 713/176; 715/237
(58) Field of Classification Search .............. 713/164, 713/165, 167, 176, 193, 194; 715/200, 234–242
See application file for complete search history.

(56) References Cited

U.S. PATENT DOCUMENTS

| | | | |
|---|---|---|---|
| 5,673,316 A | | 9/1997 | Auerbach et al. |
| 6,028,938 A | * | 2/2000 | Malkin et al. ................. 713/176 |
| 6,990,585 B2 | | 1/2006 | Maruyama et al. |
| 7,809,698 B1 | * | 10/2010 | Salz et al. ..................... 707/694 |

OTHER PUBLICATIONS

J. Kosek, et al., *Relaxed—On the Way Towards True Validation of Compound Documents* (WWW2006), Edinburgh, Scotland, May 23-26, 2006.
XML Signature Patent Disclosures, http://www.w3.org/Signature/Disclosures.html , Retrieved Apr. 21, 2008, p. 1.
XML Signature WG, http://www.w3.orq/Signature/Overview.html , Retrieved Apr. 21, 2008, pp. 1-4.
Namespace-Based Validation Dispatching Language (NVDL), ISO/IEC 19757-4 Standard, http://www.nvdl.org/ , Retrieved Apr. 21, 2008, pp. 1-2.
XML Schema, http://en.wikipedia.org/wiki/XML_schema , Retrieved Apr. 21, 2008, pp. 1-2.
Relax NG, http://en.wikipedia.org/wiki/RELAX_NG , Retrieved Apr. 21, 2008, pp. 1-3.
Coordinated Universal Time (UTC), http://en.wikipedia.org/wiki/Coordinated_Universal_Time, Retrieved Apr. 21, 2008, pp. 1-6.

* cited by examiner

*Primary Examiner* — Edward Zee
(74) *Attorney, Agent, or Firm* — Fay Sharpe LLP

(57) ABSTRACT

A system, method, and computer program product for computing a digest value of a document, one or more schemas, and a validation report. The validation report indicates a validation status of the document based on the schema or schemas. The digest value is encrypted to produce a digital signature of the document, the schema or schemas, and the validation report.

24 Claims, 6 Drawing Sheets

SYSTEM AND METHOD FOR PRODUCING AND CHECKING VALIDATION CERTIFICATES

BACKGROUND

The exemplary embodiment relates to a system and method for ensuring consistency between a document instance, such as an Extensible Markup Language (XML) document, and validation operations applied to it. It finds particular application in connection with the use of a validation certificate for tracking and maintaining the consistency between an XML document instance and the applied validation operations.

A schema, as referred to herein, defines the internal structure of a document. For example, a schema can describe the structure for how the document should be organized, e.g., sections and sub-sections. Schemas can, of course, be more complex than this simple example and, in general, provide a set of constraints defining the document structure. Many documents are structured according to various standards such as, e.g., technical reports, and schemas help to ensure each document is constructed according to some predefined construction rules. Many schemas exist according to various standards. An XML schema, in particular, is a description of a type of XML document, typically expressed in terms of constraints on the structure and content of documents above and beyond the basic syntax constraints imposed by XML itself.

An XML schema provides a view of the document type at a relatively high level of abstraction. An XML Schema can include, e.g., type definitions and element declarations which can be used to assess the validity of elements and attributes of an XML document. Various languages have been developed to express XML schemas such as the Document Type Definition (DTD) language, which is native to the XML specification. Other schema languages include, e.g., the World Wide Web Consortium (W3C) XML Schema Language (XSD), RelaxNG, Schematron, and NVDL. Each language exhibits particular operational qualities and specific expressive power, justifying their concomitant use in a demanding validation environment. In the context of XML documents, validation normally involves writing a detailed specification for the document's contents in a schema language. XML documents can then be validated by validation engines interpreting the appropriate validation language, and by any of a number of mechanisms, including cascading several validation operations with increasing complexity or addressing heterogeneous properties.

It is readily apparent that the above-described validation processes are becoming increasingly complicated and time consuming, having a high computing cost. However, XML documents are processed through transformation pipes that do not explicitly store or maintain a memory of previous validation operations, either inside or outside of the documents. Thus, as document complexity and volume increases, increasing amounts of computer time are wasted in reasserting document validity by repeating the validation process. However, these validation operations would not require repetitive processing if the results of prior validation operations were available they could be checked by processors provided that this information could be maintained in the processing chain. Presently, however, validation operations are not tracked or kept track of in such a way that a level of certification can be relied upon. Therefore, there exists a need for an improved method of ensuring consistency between an XML document instance and validation operations applied to it, thereby reducing or eliminating unnecessary repetition of validation processing.

INCORPORATION BY REFERENCE

The following references, the disclosures of which are incorporated herein in their entireties by reference, are mentioned:

U.S. Pat. No. 5,673,316, entitled CREATION AND DISTRIBUTION OF CRYPTOGRAPHIC ENVELOPE, by Auerbach, et al., discloses a method and apparatus to create, distribute, sell and control access to digital documents using secure cryptographic envelopes.

U.S. Pat. No. 6,990,585, entitled DIGITAL SIGNATURE SYSTEM, DIGITAL SIGNATURE METHOD, DIGITAL SIGNATURE MEDIATION METHOD, DIGITAL SIGNATURE MEDIATION SYSTEM, INFORMATION TERMINAL AND STORAGE MEDIUM, by Maruyama, et al., discloses digital signature techniques using an information terminal, such as a portable terminal, having limited calculation resources.

BRIEF DESCRIPTION

In one aspect of the exemplary embodiment, a computer-implemented method for producing a validation certificate is provided. The method includes signing a document, related schema or schemas, and a validation report which indicates a validation status of the document based the schema(s). The signing includes computing a digest value of the document, the schema(s), and the validation report, and encrypting the digest value to produce a digital signature. The validation certificate includes the digital signature, the document or a solvable reference to the document, the schema(s) or a solvable reference to the schema(s), and the validation report or a solvable reference to the validation report.

Also provided is a computer system for producing a validation certificate. The system includes a system memory, a central processing unit for controlling operation of application programs in the system memory, and a communication interface for communicating with other computer systems or a network. The computer system is configured to perform a computer-implemented method that includes signing a document, related schema or schemas, and a validation report which indicates a validation status of the document based the schema(s). The signing includes computing a digest value of the document, the schema(s), and the validation report, and encrypting the digest value to produce a digital signature. The validation certificate includes the digital signature, the document or a solvable reference to the document, the schema(s) or a solvable reference to the schema(s), and the validation report or a solvable reference to the validation report.

Further provided is a computer program product including a computer usable medium which has computer readable instructions stored thereon that, when executed by a computer, cause the computer to perform a method. The performed method includes signing a document, related schema or schemas, and a validation report which indicates a validation status of the document based the schema or schemas. The signing includes computing a digest value of the document, the schema(s), and the validation report, and encrypting the digest value to produce a digital signature. The validation certificate includes the digital signature, the document or a solvable reference to the document, the schema(s) or a solvable reference to the schema(s), and the validation report or a solvable reference to the validation report.

Still further provided is a computer system for checking a validation certificate, wherein a digest value of a document, related schema(s), and a validation report, indicate a validation status of the document based on the schema(s), and wherein the digest value has been encrypted to produce the validation certificate. The encrypted digest value includes a digital signature of the document, the schema(s), and the validation report. The system includes a memory which stores instructions for verifying by a signature checking engine that the document has not been modified to an extent that it is not valid against the digital signature without needing to validate the document. The system further includes a processor in communication with the memory which executes the instructions.

DETAILED DESCRIPTION

Disclosed herein are a system and method for using a validation certificate for tracking and maintaining the consistency between an XML document instance and validation operations previously applied to the document.

Figure 1:
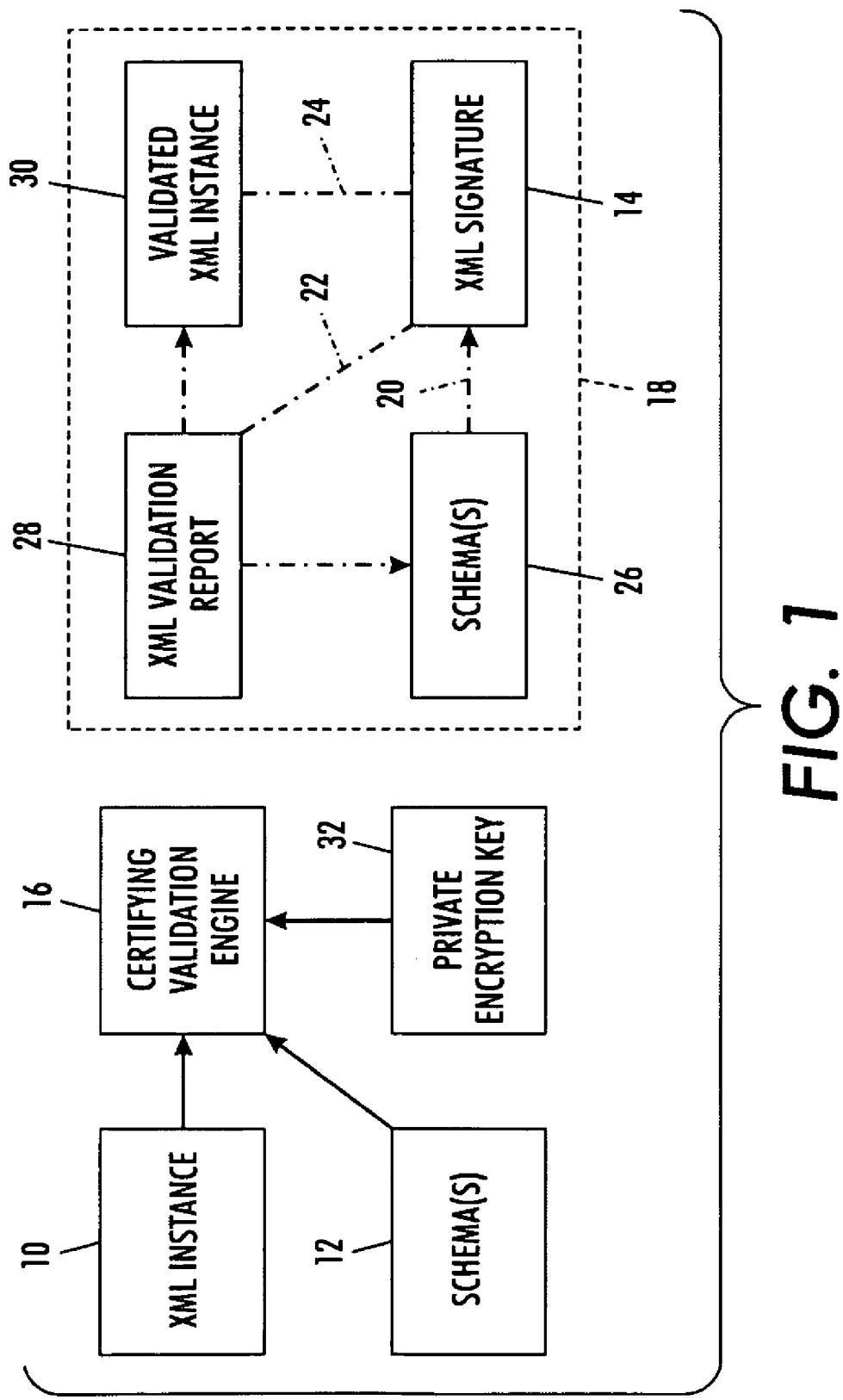
FIG. 1 shows validation and signing operations in exemplary embodiments on a document instance.

With reference to FIG. 1, in brief, validation operations on a document instance 10 with reference to resources such as, e.g., schemas 12, in exemplary embodiments, are tracked through a signature 14 associated with the related document instance 10. In one embodiment, the signature 14 is contained in inside the document, while in another embodiment the signature is maintained externally. However, in each exemplary embodiment, the signature is certified by a certifying validation engine 16. The certification process provides a certificate 18 which is assurance to a user that the document has been validated using the resources 12 and environment described by the signature 14. This ensures to the user that the certified document instance has not been significantly modified since the most recent validation operation. The phrase "not significantly modified", with reference to the embodiments described herein, is intended to mean that the document has not been modified in a manner that would change its meaning or interpretation to the user. For example, some embodiments may allow for the insertion of comments inside the structure of the document, provided the comments are not changing the text or language of the validated document. The degree of modification permitted by the validation process is flexible, and may vary according to the needs of the issuers of the validation certificate. The certificate 18 is thus, not only a technical means to ensure document integrity, but also serves as a commitment from the validation certificate issuer.

The exemplary embodiments described herein are described with reference to XML documents, XML signatures and XML validation processes and schemas. It is to be appreciated, however, that the present application is not so limited, and the concepts described herein can be applied with equal efficacy to other types of documents and validation processes. However, because the exemplary embodiments are herein described with reference to XML documents, some background on XML signatures is provided.

A joint Working Group of the World Wide Web Consortium (W3C) and the Internet Engineering Task Force (IETF) has a stated mission of developing an XML compliant syntax used for representing the signature of Web resources and portions of protocol messages (anything which can be referenced by a URL) and procedures for computing and verifying such signatures. The kind of data that can be signed varies from binary files to XML files, essentially any digital file or document. Once computed for an XML document instance, the XML signature itself is an XML document. Depending on the embodiment, the XML signature may be referred to as a detached signature, an enveloping signature, or an enveloped signature.

The detached XML signature 14 is shown in FIG. 1 and refers to external resources or documents, with only solvable references 20, 22, 24 to the schema(s) 26 (including any other associated validation resources), validation report(s) 28, and/or document(s) 30 being embedded in the signature 14. The term solvable references, as used herein, describes references which permit accessing or retrieving the referenced object, e.g., a URL or a file system path. Enveloping signatures, on the other hand, embed instances of the schema(s) 26, validation report(s) 28, and/or document(s) 30 within the signature, while enveloped signatures are, instead, embedded within the distributed XML document(s) 30. Rather than embedding native instances of the resources, validation reports, and/or documents within the enveloping signature, it is also possible in some embodiments to encrypt the embedded objects either in part or in their entirety within the certificate. Of course, to be effective in providing assured integrity to a user, the instances 26, 28, 30 referred to in a detached signature should be stored in a stable environment where they can be retrieved by the user in a stable and reliable manner, e.g., a stable URL. However, there is not always an issue with regard to integrity. For example, in the case of detached signatures, once solved, the reference is checked by the signature checking engine. Thus, fake references cannot lead to fake certification. However, in the case of a detached signature that does not solve links, only the URL, e.g., itself is checked, not the target document. In this case, it is the URL which is certified, not the target resource. This method is more efficient, but requires strong properties with respect to the URLs: they must be stable, and it is the responsibility of the service provider hosting the target resources to guarantee availability and integrity of the target document. Thus, there is a choice of methods which can be applied to the detached signature, and the most appropriate method is chosen according to the business model and other technical considerations (e.g., size of documents).

Although only the detached form of the signature is shown in the FIGURE, it is to be appreciated that the enveloping and enveloped signature operate in a conceptually similar manner and are not separately shown in the FIGURE. Further, exemplary embodiments are not restricted to purely detached, enveloping and enveloped forms of the signature, and hybrid variations of the signature fall within the scope of the present application. However, regardless of whether a detached, enveloping or enveloped form of the signature is utilized, the XML document instance(s) 30, the schema(s) 26, and the XML validation report(s) 28 are signed. This provides coherence and assurance that what is encoded in the document is correct with respect to the associated validation report.

In more formal terms the joint Working Group defines a digital signature as a value generated from the application of a private key 32 to a message (or document) via a cryptographic algorithm such that it has the properties of integrity, message authentication and/or signer authentication. A signature may, as previously described, be non-exclusively described as detached, enveloping, or enveloped. However, the term signature is also sometimes referred to generically such that it encompasses authentication code values as well.

The W3C technology is twofold. First, it allows creating a signature according to some specifications that parameterize the process. This information includes references to the instances of information being signed, the algorithms used for preprocessing the information, the algorithm used for computing a digest value of the target information instance(s) and finally, an encryption key and method that are applied to the digest value, resulting in a digital signature. Thus, if the target information is significantly changed, a later computation of the digest will lead to a different value, and reciprocally any alteration of the digest would be detectable due to the encryption mechanism. Additionally, the encryption key authenticates the signer, thus leading to non-repudiation, i.e., the signer cannot deny that he or she provided the signed document.

As a consequence, once signed, an XML document cannot be substantially modified undetectably, i.e., only changes that keep the document invariant according to a normalization and transformation method specified in the signature are allowed. Minimal changes such as, e.g., white space, order of attributes, comments, etc. can be allowed, but the degree of allowance can be customized for any specific application as previously described.

The signature creation is thus a rather complex process. For example, referenced documents are fetched, normalized and transformed according to a specification; a digest value is then computed according to a digest algorithm, e.g., a numerical hash value; the digest value is then encrypted by an encryption algorithm; and the XML signature file is then created, containing the information required to enable future verification. In one embodiment, the digest value is a hash code computed in such a way that there is either no probability or a very low probability of finding a crash value. Some embodiments use known digesting algorithms such as, e.g., MD-5 or SHA-1. The SHA-1 hash function is one of five cryptographic hash functions designed by the National Security Agency (NSA) and published by the National Institute of Standards and Technology (NIST) as a U.S. Federal Information Processing Standard. The MD-5 (Message-Digest algorithm 5) is a widely used, partially insecure, cryptographic hash function with a 128-bit hash value.

Figure 2:
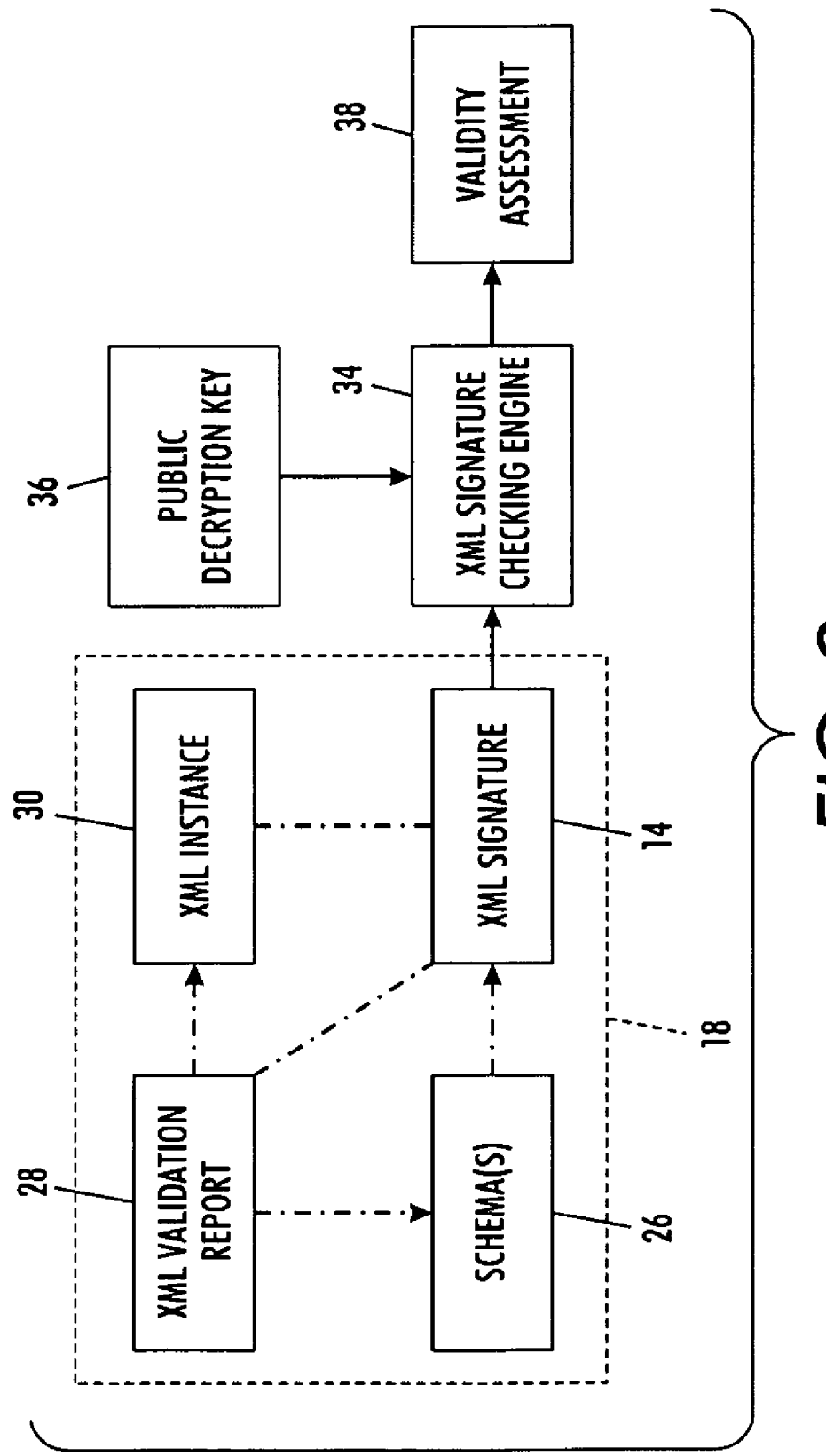
FIG. 2 shows utilizing a signature checking engine in exemplary embodiments to verify that a signed document instance is valid against a signature file.

The second aspect of the twofold nature of the W3C technology is now described with reference to FIG. 2, and continuing reference to FIG. 1, wherein like numerals represent like elements. The second aspect includes utilizing a signature checking engine 34 to verify that a signed document instance 30 is valid against a signature file 14. This is facilitated by explicitly referencing the target information, i.e., schema(s) 26, validation report(s) 28, and/or document(s) 30, either by reference to an external location or by direct incorporation inside the signature file. The normalization and transformation algorithms can also be specified, and a public decryption key 36, i.e., the public part of the encryption key 32, is inserted into the signature 14, thereby enabling decryption of the digest and production of a validity assessment 38 for comparison purposes. In other words, a user can make use of the public decryption key 36 to ensure that the signature 14 has not been altered or corrupted, and the contents are coherent with respect to each other. This can be a beneficial feature of the exemplary embodiments for documents retained for long periods of time. For example, after 10 years, it may not be possible to rerun the validation process due to software updates, or lack of access to the original validation software; therefore, it is helpful to have the certificate to verify the references, that the document is still valid without rerunning the validation process.

The exemplary embodiments can operate at either of two certification levels as desired. At the first level, the certificate 18 attests that a given instance has been checked once with the declared validation resources. Time of the validation operation is part of the certified information in some embodiments. Although the certificate attests that a given instance has been checked, this doesn't necessarily imply that the referenced or embedded/embedding document is error free, but more broadly indicates that the validation report 28 produced by the validation operation and associated with the certified instance 30 is consistent with the validation report 28.

Users of the document, whether persons or programmed applications, may verify that the certificate 18 is valid by checking the certificate consistency. The resources can be referenced in a precise way, including versioning information of the schemas 26 if relevant, and versioning information of the validation engine 16 used for the validation operation.

The second certification level additionally provides remote and reproducible validation operations. The certificate 18 can include a time frame for which the issuer of the validation certificate 18 will ensure a compatible validation service. The specified time frame thereby provides a limit to the total time for which the issuer must maintain the remote validation operations, although the issuer can voluntarily provide the services beyond the specified time frame if so desired. For instance, using such a certificate, a customer could ask the certificate issuer for a compatible validation operation to assess the validity of a slightly modified document 30 using a similar or compatible validation infrastructure. This implies, as described above, that the certificate issuer will ensure the preservation of the resources and environment during the time frame covered by the certificate 18.

For both of the aforementioned certification levels, however, the exemplary embodiments ensure integrity of the document instance 30, integrity of the validation resources 26, and integrity of the validation context (e.g., versions and identification of components used during the validation process). Thus, any person or programmed application receiving a validation certificate 18 is provided assurance that the integrity of the document instance 30 and the validation report 28 is maintained, and that the certified document instance 30 conforms to the validation report 28. Thus, the validation certificate 18 refers to a document instance 30 that could be either successfully validated using the certified resources in the certified environment or validated with the reported errors by the certified resources in the certified environment. These errors, whether an error code, explicit message or any useful related information, are included inside the validation report 28. For the latter case of validating using the certified resources, the validation report 28 refers to the instances 30, subject to the validation, the associated schemas and the full context through stable URLs pointing to external resources provided by the certificate issuer. The validation report may also embed directly the validation material, particularly when the volume is not large.

Figure 3:
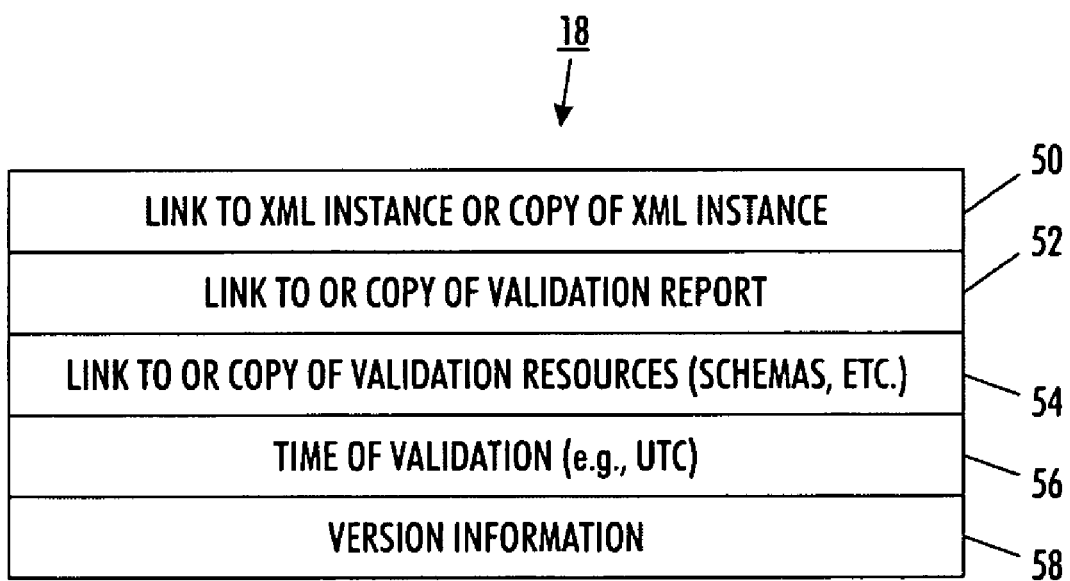
FIG. 3 is a block diagram of an exemplary validation certificate.

With reference to FIG. 3, a validation certificate 18 utilized by the exemplary embodiments includes data structures for a link 50 to, or a copy of the validated instance 30, a link 52 to, or a copy of the validation report 28, and a link 54 to, or a copy of the validation resources 26, e.g., schemas and any related files. The certificate may also contain additional information such as, e.g., the coordinated universal time (UTC) 56 at which time the validation operation was executed, and versions and identification 58 of the various components used during the validation process, wherein each item of additional information is part of, or relates to, the validation context.

For the validation certificate 18, as previously discussed, the exemplary embodiments utilize various forms, based e.g., on the known forms for XML signatures. In one embodiment, the certificate utilizes a fully detached XML signature 14, which signs an external XML document 30, wherein the validation report 28 includes the external reference information, e.g., a link to the target instance. In another embodiment, the certificate relies on an enveloping XML signature, and thus embeds the validation report 28 itself and any dependencies inside a monolithic XML document 30. In yet another embodiment, the certificate is inserted inside the validated document instance itself.

With regard to external resource or document references, embodiments are not restricted with respect to the form of the reference, however, the reference mechanism used should be stable, e.g., the signed information encompasses a "stable" URL, in order for the certification mechanism to be reliable. Such a stable URL can be provided by the certificate issuer's server providing permanent links (permalinks), which are pointers to versioned resources, software or documents. Other embodiments use relative links, and package components (e.g., validation certificate, document instance, resources, etc.) inside a file such as a compressed archive, e.g., a ZIP file.

Upon receiving a document 10, if the document is not certified, the user may invoke the certifying validation engine 16 through any relevant invocation mechanism such as, e.g., a standalone command, a remote call to a dedicated web service or through a Web based application. However, if the document is certified, the user can check the validity of the certificate through a certificate check. In the case of XML signatures, this operation is simply the signature checking mechanism as defined by the W3C standard. It assesses that neither the document instance nor the validation resource has been modified. Once successfully checked, the certificate 18 confirms that the related document instance 30 can be reliably counted as being valid with respect to the claimed validation resources if the validation report contains no errors. On the other hand, if the validation report contains error indications, the document instance can at least be considered as consistent with respect to the validation report, i.e., the same validation operation executed inside the same environment would produce a like validation report.

Alternative embodiments associate a simple digest code as the certificate. The digest code, such as, for instance, computed from the SHA-1 algorithm would facilitate checking the consistency of the validated document instance and the related validation resources. However, in these alternative embodiments, a malicious intervention could change the document content and regenerate a compatible digest code that both could lead to a non detectable yet incoherent certificate. Thus, these embodiments are more suited for environments where document safety is of less critical concern to the users.

Figure 4:
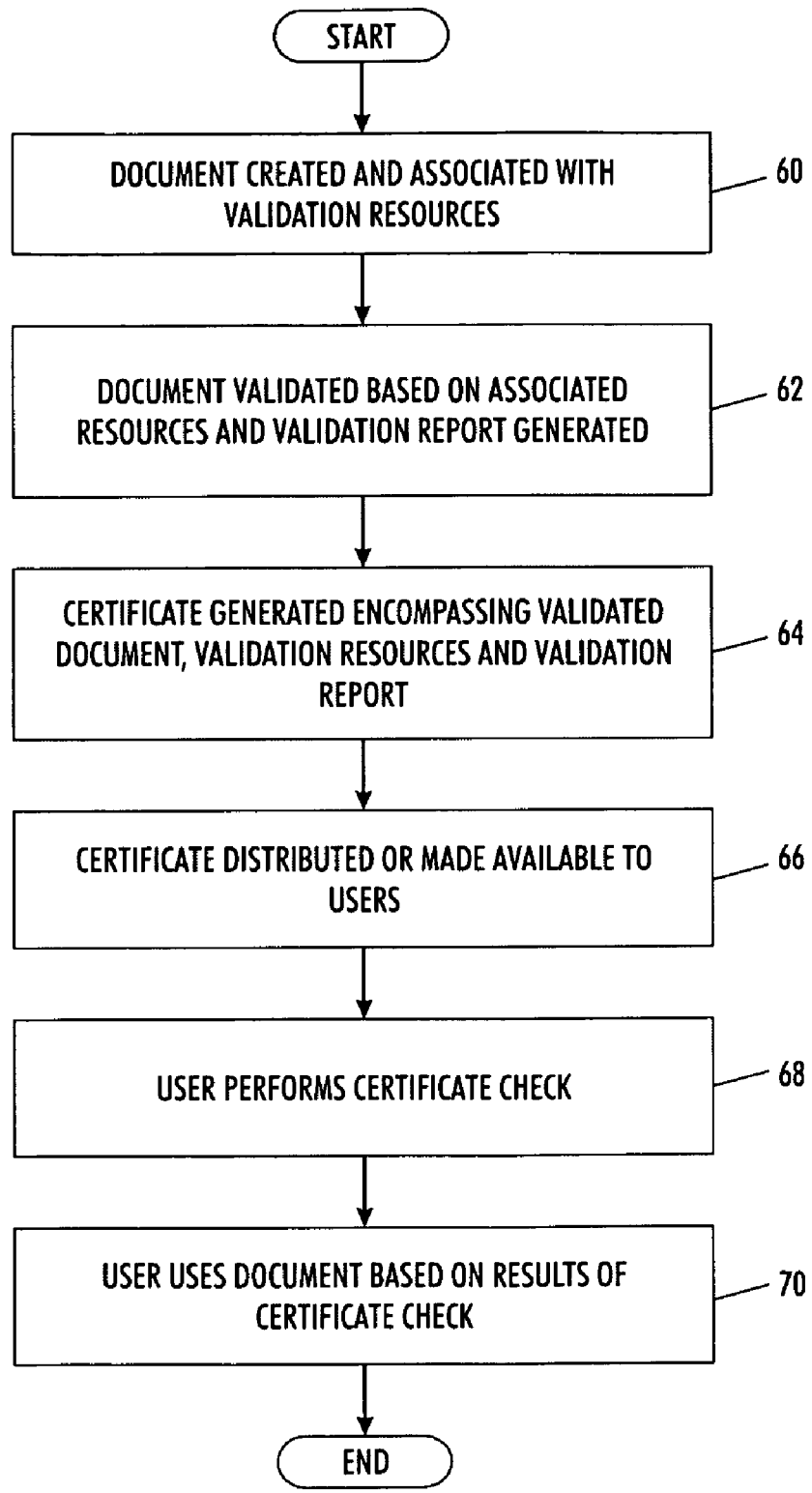
FIG. 4 is a flowchart illustrating a method for producing a validation certificate in accordance with an exemplary embodiment of the present application.

With reference now to FIG. 4, a method is shown in summary form describing an exemplary embodiment of the present application. The described steps are consistent with embodiments previously described and, therefore, are not described in detail. In a first step 60, a document is created and associated with validation resources 26, e.g., schemas. The document is then validated at step 62 based on the associated resources 26, and a validation report 28 is generated. At step 64, a validation certificate 18 is generated, encompassing the validated document 30, the validation resources 26, and the validation report 28. It is to be understood that the encompassing can be in various forms, such as detached, enveloping and enveloped, as previously described. At step 66, the validation certificate 18 is distributed to, or accessed by, a user. The user utilizes a signature checking engine 34 to perform a signature check of the certificate at step 68. The user, at step 70, then uses the document based on the results of the certificate check, and further based on contents of the validity report.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the method for validation and checking.

Figure 5:
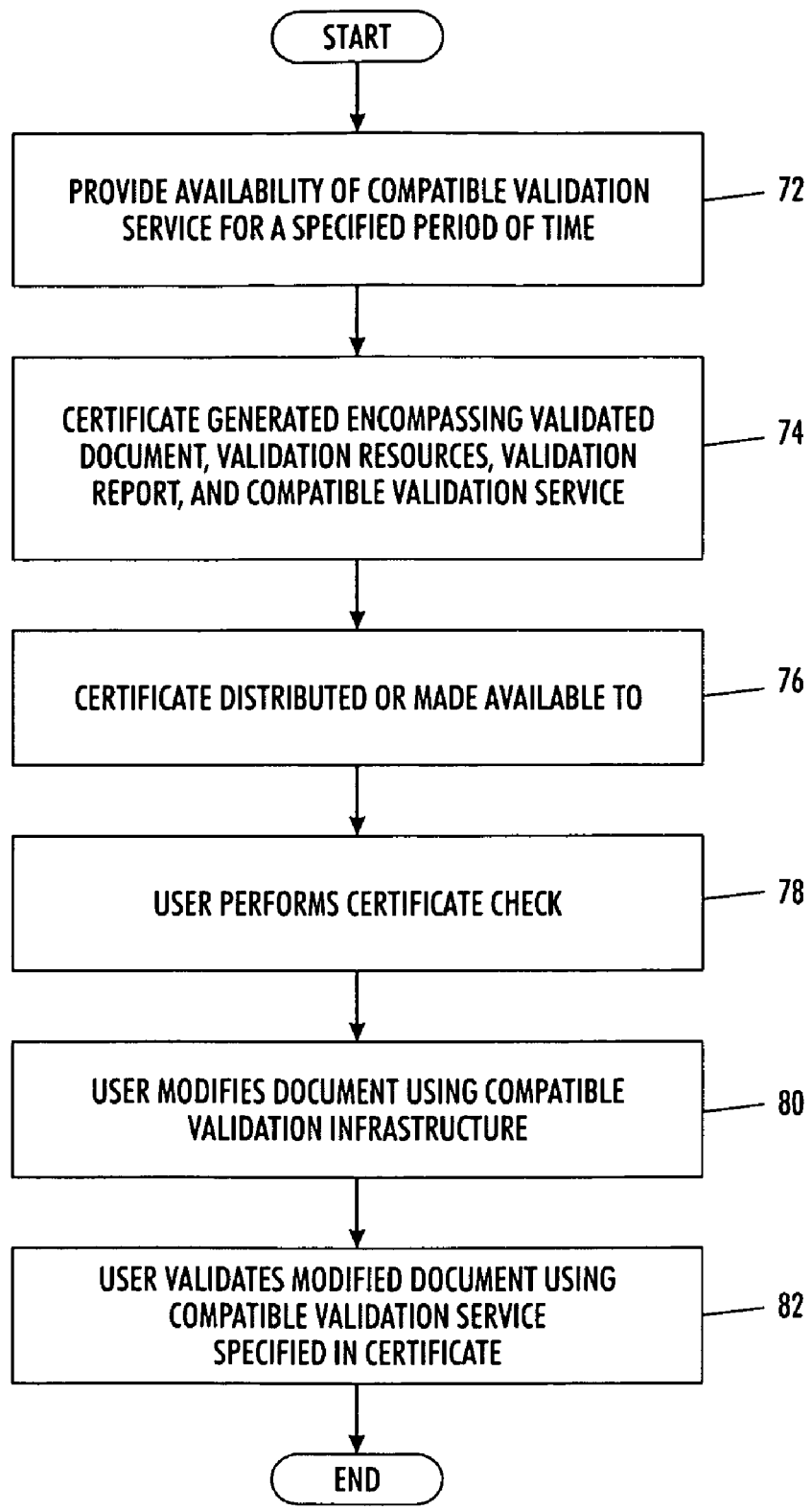
FIG. 5 is a flowchart illustrating method for an exemplary embodiment which provides remote and reproducible validation operations.

With reference now to FIG. 5, and continuing reference to FIG. 4, a method is shown in summary form describing an embodiment incorporating features of the previously described second certification level which provides remote and reproducible validation operations. It is assumed that the document has already been created (60) and that the document has been validated (62). The issuer of the certificate being generated, at step 72, makes available compatible validation services for a specified period of time. At step 74, a validation certificate 18 is generated which encompasses the validated document 30, the validation resources 26, the validation report 28, and stable references to the compatible validation services. At steps 76 and 78, the certificate is distributed to or accessed by a user, and the user performs a certificate check utilizing a signature checking engine 34. At step 80, the user may make modifications to the document instance 30, using a compatible validation infrastructure, e.g., a compatible schema language. At step 90, the user validates either the received document instance 30 or the modified document instance using the compatible validation services referenced in the received validation certificate 18.

The methods illustrated in FIGS. 4-5 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

Figure 6:
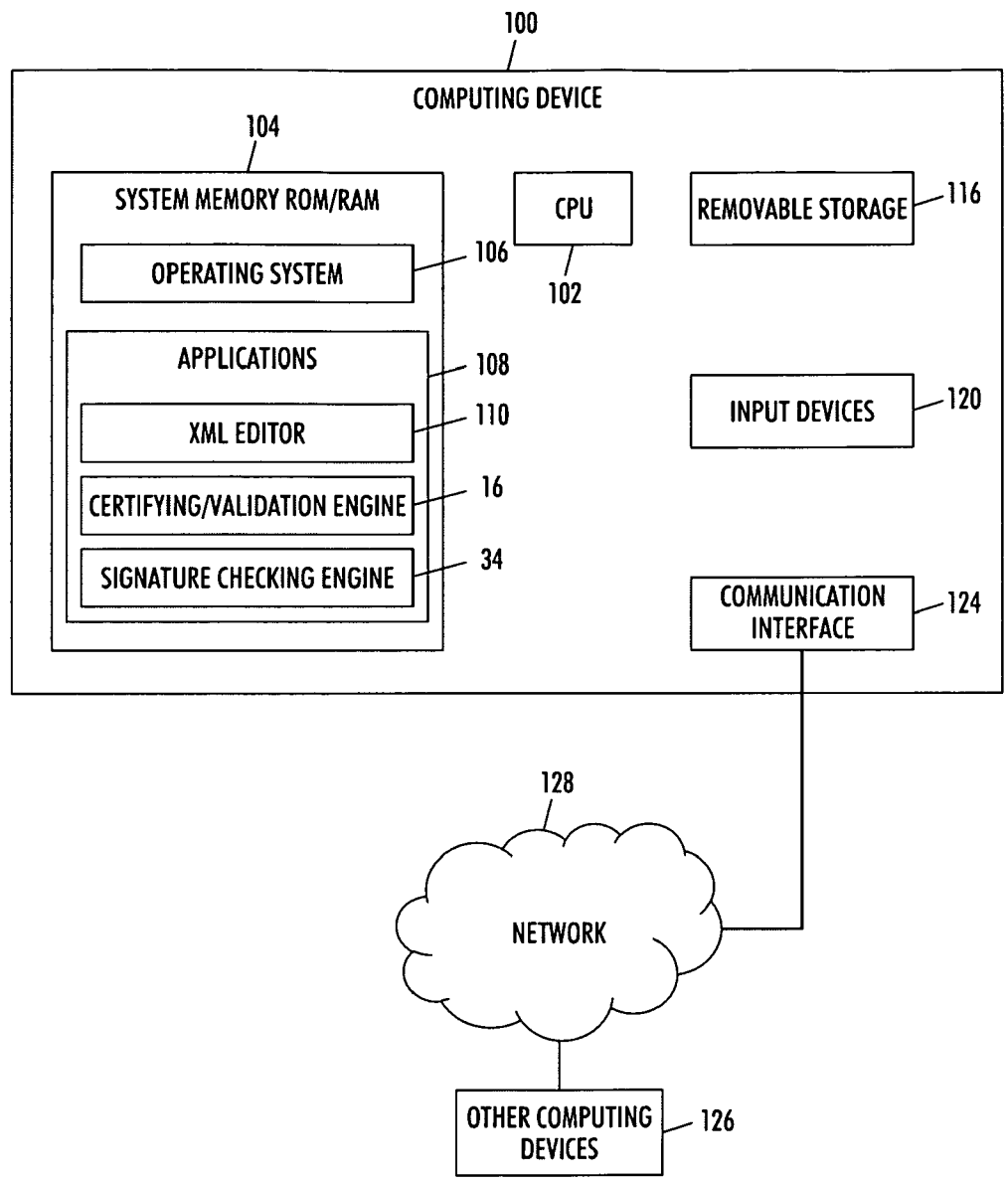
FIG. 6 is an exemplary system for validating a document in accordance with an exemplary embodiment of the present application.

With reference now to FIG. 6, an exemplary environment incorporating embodiments of the present application is shown. A system 100, e.g., a computing device, includes at least one processing unit (CPU) 102 and system memory 104, e.g., ROM and/or RAM depending on the configuration and type of computing device. System memory 104 includes an operating system 106, and one or more applications 108 such as, e.g., an XML document editor 110, a certifying validation engine 16, and a signature checking engine 34, depending on the particular embodiment. The system memory may also be used for storing documents 10 during document editing and/or during document validation processing. The system 100 may include additional features or functionality. For example, system 100 may also include additional data storage devices such as removable storage devices 116. Computer storage media may include volatile and nonvolatile, removable and non-removable media implemented in any method or technology for storage of information, such as computer readable instructions, data structures, program modules, or other data. System memory 104 and removable storage 116 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the system 100. Any such computer storage media may be part of device 100. The system 100 may also have an input device or devices 120 for entering XML document instances 10 and/or instructions for the certifying/validation engine 16, etc. Exemplary input devices include a keyboard, a mouse, a pen, a voice recognition device, a touch input device, etc. These devices are well known in the art and are not further discussed herein. The system 100 may also contain a communication interface 124 that enables communication with other computing devices 126, such as over a network 128. The other computer devices 126 may be additional systems similar to system 100 in which certificates 18 are distributed and/or received. As will be appreciated, one or more components of the exemplary computing device 100 may be suitably located on the computing device 100 or on a separate device in communication with the computing device 100.

Although the system 100 is shown incorporating an XML document editor 110, a certifying validation engine 16, and a signature checking engine 34, it is to be appreciated that particular embodiments may incorporate only components needed for a particular application. For example, a user receiving a certificate 18 may only have need for the signature checking engine 34, whereas a producer of the certificate 18 may only have need for the certifying validation engine 16, and possibly the XML document editor 110. Further, the system may include devices appropriate for sending/receiving the certificate 18 in their respective operating environment. For example, a certificate 18 can be distributed and/or received by means of the removable storage 116 or the communication interface 124.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for producing a validation certificate, the method comprising:

computing a digest value of a document, at least one schema, and a validation report, wherein the validation report indicates a validation status of the document based on the at least one schema and encrypting the digest value to produce a digital signature of the document, the at least one schema, and the validation report, whereby the document, the at least one schema, and the validation report are each signed; and generating a validation certificate, the validation certificate comprising:

the digital signature;

at least one of the document and a solvable reference to the document;

at least one of the at least one schema and a solvable reference to the at least one schema; and at least one of the validation report and a solvable reference to the validation report.

2. The method of claim 1, wherein the document comprises an XML document, the at least one schema comprises at least one XML schema, the validation report comprises an XML validation report, and the digital signature comprises an XML signature.

3. The method of claim 1, wherein the digital signature is at least one of a detached signature, an enveloping signature, and an enveloped signature.

4. The method of claim 1, wherein:

the generating of the validation certificate comprises incorporating at least one of the document, the at least one schema, and the validation report into the validation certificate.

5. The method of claim 1, wherein:

the generating of the validation certificate comprises incorporating at least one of a first solvable reference to the document, a second solvable reference to the at least one schema, and a third solvable reference to the validation report into the validation certificate.

6. The method of claim 1, further comprising:

encrypting at least a portion of at least one of the document, the at least one schema, and the validation report; and wherein the generating of the validation certificate comprises incorporating the encrypted at least one of the document, the at least one schema, and the validation report into the validation certificate.

7. The method of claim 1, wherein:

the generating of the validation certificate comprises inserting a time at which the validation report was generated into the validation certificate.

8. The method of claim 1, further comprising:

in response to a user request, verifying that the document has not been modified to an extent that it is not valid against the digital signature.

9. The method of claim 1, wherein:

the generating of the validation certificate comprises providing in the validation certificate, a reference to a stable validation service, wherein the document can be validated against the at least one schema utilizing the stable validation service.

10. The method of claim 9, wherein:

the generating of the validation certificate comprises providing in the validation certificate, a time range during which the stable validation service is guaranteed to be available for validating at least one of the document and a modified version of the document against the at least one schema.

11. A computer system for producing a validation certificate, the system comprising:

memory, which stores instructions for:

computing a digest value of a document, at least one schema, and a validation report, wherein the validation report indicates a validation status of the document based on the at least one schema and encrypting the digit value to produce a digital signature, whereby the document, at least one schema, and the validation report are each signed;
generating a validation certificate, the validation certificate comprising:
the digital signature;
at least one of the document and a solvable reference to the document;
at least one of the at least one schema and a solvable reference to the at least one schema; and
at least one of the validation report and a solvable reference to the validation report; and
a processor in communication with the memory which executes the instructions.

12. The system of claim 11, wherein the document comprises an XML document, the at least one schema comprises at least one XML schema, the validation report comprises an XML validation report, and the digital signature comprises an XML signature.

13. The system of claim 11, wherein the digital signature comprises at least one of a detached signature, an enveloping signature, and an enveloped signature.

14. The system of claim 11, wherein the instructions for generating the validation certificate comprise instructions for:
incorporating at least one of the document, the at least one schema, and the validation report into the validation certificate.

15. The system of claim 11, wherein the instructions for generating the validation certificate comprise instructions for:
incorporating at least one of a first solvable reference to the document, a second solvable reference to the at least one schema, and a third solvable reference to the validation report into the validation certificate.

16. The system of claim 11, wherein the instructions further comprise instructions for:
encrypting at least a portion of at least one of the document, the at least one schema, and the validation report; and
the instructions for generating the validation certificate comprise instructions for incorporating the encrypted at least one of the document, the at least one schema, and the validation report into the validation certificate.

17. The system of claim 11, wherein the instructions for generating the validation certificate comprise instructions for:
inserting a time at which the validation report was generated into the validation certificate.

18. The system of claim 11, wherein the instructions further comprise instructions for:
providing a signature checking engine which enables a user to verify that the at least one of document has not been modified to an extent that it is not valid against the digital signature.

19. The system of claim 11, wherein the instructions for generating the validation certificate comprise instructions for:
providing in the validation certificate, a reference to a stable validation service, wherein the document can be validated against the at least one schema utilizing the stable validation service.

20. The system of claim 19, wherein the instructions for generating the validation certificate comprise instructions for:
providing in the validation certificate, a time range during which the stable validation service is guaranteed to be available for validating at least one of the document and a modified version of the document against the at least one schema.

21. A computer-implemented method for producing a validation certificate, the method comprising:
providing an XML document and at least one XML schema or a solvable external reference to the XML schema;
providing a validation report for the XML document which indicates a validation status of the document with respect to the at least one XML schema;
with a computer processor and a cryptographic algorithm, signing the XML document, XML schema or solvable external reference to the XML schema, and the validation report to produce a digital signature; and
generating a validation certificate, the validation certificate comprising:
the digital signature,
a link to, or a copy of the validated XML document,
a link to, or a copy of the validation report, and
a link to the external reference, or a copy of the XML schema.

22. A computer-implemented method for producing a validation certificate, the method comprising:
computing a digest value of a document, at least one schema, and a validation report, wherein the validation report indicates a validation status of the document based on the at least one schema;
encrypting the digest value, the encrypted digest value comprising a digital signature of the document, the at least one schema, and the validation report, whereby the document, at least one schema, and the validation report are each signed; and
generating a validation certificate, the validation certificate comprising the encrypted digest value.

23. A computer program product comprising:
a non-transitory computer usable medium having computer readable instructions stored thereon that, when executed by a computer, cause said computer to perform a method comprising:
computing a digest value of a document, at least one schema, and a validation report, wherein the validation report indicates a validation status of the document based on the at least one schema and encrypting the digest value to produce a digital signature of the document, the at least one schema, and the validation report, whereby the document, the at least one schema, and the validation report are each signed; and
generating a validation certificate, the validation certificate comprising:
the digital signature;
at least one of the document and a solvable reference to the document;
at least one of the at least one schema and a solvable reference to the at least one schema; and
at least one of the validation report and a solvable reference to the validation report.

24. A computer system for producing a validation certificate, the system comprising:
memory, which stores instructions for:
computing a digest value of a document, at least one schema, and a validation report, wherein the validation report indicates a validation status of the document based on the at least one schema;
encrypting the digest value, the encrypted digest value comprising a digital signature of the document, the at least one schema, and the validation report, whereby the document, at least one schema, and the validation report are each signed; and generating a validation certificate, the validation certificate comprising the encrypted digest value; and a processor in communication with the memory which executes the instructions.

* * * * *